(12) United States Patent
Banaugh et al.

(10) Patent No.: US 8,145,567 B2
(45) Date of Patent: *Mar. 27, 2012

(54) TRANSACTION ID SYSTEM AND PROCESS

(75) Inventors: Michelle Banaugh, Novato, CA (US); Timothy R. Knowlton, Mill Valley, CA (US); George L. Wood, Alamo, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1395 days.

This patent is subject to a terminal disclaimer.

(21) Appl. No.: 11/172,748

(22) Filed: Jun. 30, 2005

(65) Prior Publication Data

US 2006/0010070 A1    Jan. 12, 2006

Related U.S. Application Data

(63) Continuation-in-part of application No. 09/703,357, filed on Oct. 31, 2000, now Pat. No. 7,333,953.

(60) Provisional application No. 60/585,371, filed on Jul. 2, 2004.

(51) Int. Cl.
*G06Q 40/00* (2006.01)
(52) U.S. Cl. .............................. 705/40; 705/39
(58) Field of Classification Search ............ 705/39, 705/40
See application file for complete search history.

(56) References Cited

U.S. PATENT DOCUMENTS

| | | | |
|---|---|---|---|
| 4,341,951 A | 7/1982 | Benton | |
| 4,727,243 A | 2/1988 | Savar | |
| 4,799,156 A | 1/1989 | Shavit | |
| 4,813,077 A | 3/1989 | Woods | |
| 4,823,264 A | 4/1989 | Deming | |
| 4,922,521 A | 5/1990 | Krikke et al. | |
| 4,935,870 A | 6/1990 | Burk, Jr. et al. | |
| 4,947,028 A | 8/1990 | Gorog | |
| 4,948,174 A | 8/1990 | Thomson | |
| 4,977,595 A | 12/1990 | Ohta et al. | |
| 4,982,346 A | 1/1991 | Girouard et al. | |
| 4,992,940 A | 2/1991 | Dworkin | |

(Continued)

FOREIGN PATENT DOCUMENTS

EP 803827 10/1997

(Continued)

OTHER PUBLICATIONS

Whe Dar Lin. A Mobile-Based Marketing Information Management System. Proceedings 16th IEEE Symposium on Computer-Based Medical Systems. CBMS 2003. p. 219-24. IEEE, Los Alamitos, CA. USA. 2003.

(Continued)

*Primary Examiner* — Hani Kazimi
(74) *Attorney, Agent, or Firm* — Merchant & Gould P.C.

(57) ABSTRACT

A system and process for creating, maintaining, and using transaction identifiers, i.e. a transaction DNA, is provided. The DNA, along with other transactional information, is sent through a set of intermediary entities as found in a standard transaction processing system. The DNA is based on information that may include source ID, merchant ID, and order ID. The order ID is a unique number that can be generated by the merchant. The DNA is maintained throughout the lifecycle of the transaction, including authorization requests, settlement requests, and exception item processing. The DNA allows the bank to provide precise transactional matching to the original transaction for the merchant, making reconciliation always possible, fast, and automatic, and ensuring information is presented in a manner that the merchant chooses.

12 Claims, 3 Drawing Sheets

U.S. PATENT DOCUMENTS

| | | |
|---|---|---|
| 5,025,373 A | 6/1991 | Keyser, Jr. et al. |
| 5,053,607 A | 10/1991 | Carlson et al. |
| 5,060,153 A | 10/1991 | Nakagawa |
| 5,077,607 A | 12/1991 | Johnson et al. |
| 5,093,787 A | 3/1992 | Simmons |
| 5,121,945 A | 6/1992 | Thomson |
| 5,175,682 A | 12/1992 | Higashiyama et al. |
| 5,177,342 A | 1/1993 | Adams |
| 5,220,501 A | 6/1993 | Lawlor et al. |
| 5,231,569 A | 7/1993 | Myatt et al. |
| 5,247,575 A | 9/1993 | Sprague et al. |
| 5,311,594 A | 5/1994 | Penzias |
| 5,321,751 A | 6/1994 | Ray et al. |
| 5,326,959 A | 7/1994 | Perazza |
| 5,334,823 A | 8/1994 | Noblett |
| 5,336,870 A | 8/1994 | Hughes et al. |
| 5,341,429 A | 8/1994 | Stringer et al. |
| 5,347,632 A | 9/1994 | Filepp et al. |
| 5,351,186 A | 9/1994 | Bullock et al. |
| 5,351,293 A | 9/1994 | Michener et al. |
| 5,357,563 A | 10/1994 | Hamilton |
| 5,361,201 A | 11/1994 | Jost et al. |
| 5,377,269 A | 12/1994 | Heptig et al. |
| 5,383,113 A | 1/1995 | Kight et al. |
| 5,386,104 A | 1/1995 | Sime |
| 5,386,458 A | 1/1995 | Nair |
| 5,412,190 A | 5/1995 | Josephson et al. |
| 5,414,833 A | 5/1995 | Hershey et al. |
| 5,453,601 A | 9/1995 | Rosen |
| 5,455,407 A | 10/1995 | Rosen |
| 5,465,206 A | 11/1995 | Hilt et al. |
| 5,475,585 A | 12/1995 | Bush |
| 5,477,040 A | 12/1995 | Lalonde |
| 5,483,445 A | 1/1996 | Pickering |
| 5,484,988 A | 1/1996 | Hills et al. |
| 5,496,991 A | 3/1996 | Delfer, III et al. |
| 5,500,513 A | 3/1996 | Langhans et al. |
| 5,530,438 A | 6/1996 | Bickham et al. |
| 5,532,464 A | 7/1996 | Josephson et al. |
| 5,557,518 A | 9/1996 | Rosen |
| 5,590,197 A | 12/1996 | Chen et al. |
| 5,596,642 A | 1/1997 | Davis et al. |
| 5,596,643 A | 1/1997 | Davis et al. |
| 5,604,802 A | 2/1997 | Holloway |
| 5,621,797 A | 4/1997 | Rosen |
| 5,623,547 A | 4/1997 | Jones et al. |
| 5,642,419 A | 6/1997 | Rosen |
| 5,649,114 A | 7/1997 | Deaton et al. |
| 5,649,117 A | 7/1997 | Landry |
| 5,652,786 A | 7/1997 | Rogers |
| 5,677,955 A | 10/1997 | Doggett |
| 5,680,305 A | 10/1997 | Apgar, IV |
| 5,684,965 A | 11/1997 | Pickering |
| 5,691,524 A | 11/1997 | Josephson |
| 5,696,907 A | 12/1997 | Tom |
| 5,696,909 A | 12/1997 | Wallner |
| 5,699,528 A | 12/1997 | Hogan |
| 5,710,889 A | 1/1998 | Clark et al. |
| 5,715,298 A | 2/1998 | Rogers |
| 5,715,314 A | 2/1998 | Payne et al. |
| 5,717,868 A | 2/1998 | James |
| 5,724,424 A | 3/1998 | Gifford |
| 5,745,654 A | 4/1998 | Titan |
| 5,748,737 A | 5/1998 | Daggar |
| 5,750,972 A | 5/1998 | Botvin |
| 5,757,917 A | 5/1998 | Rose et al. |
| 5,758,327 A | 5/1998 | Gardner et al. |
| 5,783,808 A | 7/1998 | Josephson |
| 5,799,087 A | 8/1998 | Rosen |
| 5,801,366 A | 9/1998 | Funk et al. |
| 5,812,668 A | 9/1998 | Weber |
| 5,815,657 A | 9/1998 | Williams et al. |
| 5,819,226 A | 10/1998 | Gopinathan et al. |
| 5,826,245 A | 10/1998 | Sandberg-Diment |
| 5,832,463 A | 11/1998 | Funk |
| 5,848,400 A | 12/1998 | Chang |
| 5,850,446 A | 12/1998 | Berger et al. |
| 5,870,456 A | 2/1999 | Rogers |
| 5,870,721 A | 2/1999 | Norris |
| 5,870,724 A | 2/1999 | Lawlor et al. |
| 5,873,072 A | 2/1999 | Kight et al. |
| 5,884,290 A | 3/1999 | Smorodinsky et al. |
| 5,889,863 A | 3/1999 | Weber |
| 5,890,140 A | 3/1999 | Clark et al. |
| 5,892,900 A | 4/1999 | Ginter et al. |
| 5,893,080 A | 4/1999 | McGurl et al. |
| 5,898,154 A | 4/1999 | Rosen |
| 5,905,736 A | 5/1999 | Ronen et al. |
| 5,910,987 A | 6/1999 | Ginter et al. |
| 5,915,019 A | 6/1999 | Ginter et al. |
| 5,917,912 A | 6/1999 | Ginter et al. |
| 5,920,629 A | 7/1999 | Rosen |
| 5,920,847 A | 7/1999 | Kolling et al. |
| 5,923,016 A | 7/1999 | Fredregill |
| 5,930,776 A | 7/1999 | Dykstra et al. |
| 5,931,917 A | 8/1999 | Nguyen et al. |
| 5,936,219 A | 8/1999 | Yoshida et al. |
| 5,936,221 A | 8/1999 | Corder et al. |
| 5,943,424 A | 8/1999 | Berger et al. |
| 5,943,656 A | 8/1999 | Crooks et al. |
| 5,949,045 A | 9/1999 | Ezawa et al. |
| 5,949,876 A | 9/1999 | Ginter et al. |
| 5,953,423 A | 9/1999 | Rosen |
| 5,956,700 A | 9/1999 | Landry |
| 5,963,648 A | 10/1999 | Rosen |
| 5,963,924 A | 10/1999 | Williams et al. |
| 5,963,925 A | 10/1999 | Kolling et al. |
| 5,970,475 A | 10/1999 | Barnes et al. |
| 5,978,840 A | 11/1999 | Nguyen et al. |
| 5,982,891 A | 11/1999 | Ginter et al. |
| 5,983,207 A | 11/1999 | Turk et al. |
| 5,983,208 A | 11/1999 | Haller et al. |
| 5,987,132 A | 11/1999 | Rowney |
| 5,991,750 A | 11/1999 | Watson |
| 5,996,076 A | 11/1999 | Rowney et al. |
| 5,999,625 A | 12/1999 | Bellare et al. |
| 6,002,767 A | 12/1999 | Kramer |
| 6,009,411 A | 12/1999 | Kepecs |
| 6,014,645 A | 1/2000 | Cunningham |
| 6,016,484 A | 1/2000 | Williams et al. |
| 6,021,202 A | 2/2000 | Anderson et al. |
| 6,026,379 A | 2/2000 | Haller et al. |
| 6,029,149 A | 2/2000 | Dykstra et al. |
| 6,029,150 A | 2/2000 | Kravitz |
| 6,029,152 A | 2/2000 | Bublitz et al. |
| 6,029,154 A | 2/2000 | Pettitt |
| 6,032,133 A | 2/2000 | Hilt et al. |
| 6,036,344 A | 3/2000 | Goldenberg |
| 6,044,362 A | 3/2000 | Neely |
| 6,047,067 A | 4/2000 | Rosen |
| 6,047,268 A | 4/2000 | Bartoli et al. |
| 6,047,887 A | 4/2000 | Rosen |
| 6,049,793 A | 4/2000 | Tomita |
| 6,052,671 A | 4/2000 | Crooks et al. |
| 6,052,675 A | 4/2000 | Checchio |
| 6,065,675 A | 5/2000 | Teicher |
| 6,070,150 A | 5/2000 | Remington |
| 6,072,870 A | 6/2000 | Nguyen et al. |
| 6,119,105 A | 9/2000 | Williams |
| 6,128,602 A | 10/2000 | Northington |
| 6,138,107 A | 10/2000 | Elgamal |
| 6,160,874 A | 12/2000 | Dickerman |
| 6,163,772 A | 12/2000 | Kramer et al. |
| 6,164,528 A | 12/2000 | Hills |
| 6,167,378 A | 12/2000 | Webber |
| 6,178,409 B1 | 1/2001 | Weber et al. |
| 6,185,545 B1 | 2/2001 | Resnick |
| 6,188,994 B1 | 2/2001 | Egendorf |
| 6,189,785 B1 | 2/2001 | Lowery |
| 6,202,054 B1 | 3/2001 | Lawlor |
| 6,226,624 B1 | 5/2001 | Watson |
| 6,243,689 B1 | 6/2001 | Norton |
| 6,253,027 B1 | 6/2001 | Weber et al. |
| 6,253,193 B1 | 6/2001 | Ginter et al. |
| 6,282,522 B1 | 8/2001 | Davis |
| 6,283,366 B1 | 9/2001 | Hills et al. |
| 6,292,789 B1 | 9/2001 | Schutzer |

| | | |
|---|---|---|
| 6,304,860 B1 | 10/2001 | Martin |
| 6,304,915 B1 | 10/2001 | Nguyen et al. |
| 6,324,525 B1 | 11/2001 | Kramer et al. |
| 6,330,546 B1 | 12/2001 | Gopinathan et al. |
| 6,341,353 B1 | 1/2002 | Herman et al. |
| 6,343,279 B1 | 1/2002 | Bissonette |
| 6,354,491 B2 | 3/2002 | Nichols |
| 6,363,363 B1 | 3/2002 | Haller et al. |
| 6,363,488 B1 | 3/2002 | Ginter et al. |
| 6,373,950 B1 | 4/2002 | Rowney |
| 6,389,402 B1 | 5/2002 | Ginter et al. |
| 6,389,403 B1 | 5/2002 | Dorak |
| 6,408,284 B1 | 6/2002 | Hilt et al. |
| 6,411,938 B1 | 6/2002 | Gates |
| 6,412,092 B1 | 6/2002 | Raghunath |
| 6,427,140 B1 | 7/2002 | Ginter et al. |
| 6,431,439 B1 | 8/2002 | Suer |
| 6,442,748 B1 | 8/2002 | Bowman-Amuah |
| 6,477,580 B1 | 11/2002 | Bowman-Amuah |
| 6,496,850 B1 | 12/2002 | Bowman |
| 6,502,213 B1 | 12/2002 | Bowman |
| 6,609,114 B1 | 8/2003 | Gressel et al. |
| 6,629,081 B1 | 9/2003 | Cornelius et al. |
| 6,640,304 B2 | 10/2003 | Ginter et al. |
| 7,333,953 B1 | 2/2008 | Banaugh et al. |
| 2001/0010046 A1 | 7/2001 | Muyres et al. |
| 2001/0042016 A1 | 11/2001 | Muyres et al. |
| 2001/0056405 A1 | 12/2001 | Muyres et al. |
| 2002/0002488 A1 | 1/2002 | Muyres et al. |
| 2002/0004744 A1 | 1/2002 | Muyres et al. |
| 2002/0010679 A1 | 1/2002 | Felsher |
| 2002/0032612 A1 | 3/2002 | Williams et al. |
| 2002/0048369 A1 | 4/2002 | Ginter et al. |
| 2002/0073043 A1 | 6/2002 | Herman et al. |
| 2002/0112171 A1 | 8/2002 | Ginter et al. |
| 2003/0088784 A1 | 5/2003 | Ginter et al. |
| 2003/0105721 A1 | 6/2003 | Ginter et al. |
| 2003/0140007 A1 | 7/2003 | Kramer et al. |
| 2003/0163431 A1 | 8/2003 | Ginter et al. |
| 2003/0191719 A1 | 10/2003 | Ginter et al. |
| 2004/0054630 A1 | 3/2004 | Ginter et al. |
| 2006/0074799 A1 | 4/2006 | Averyt |
| 2006/0089906 A1 | 4/2006 | Rowley |
| 2008/0162317 A1 | 7/2008 | Banaugh et al. |

FOREIGN PATENT DOCUMENTS

| | | |
|---|---|---|
| EP | 0944879 B1 | 9/1999 |
| EP | 0 992 952 A2 | 4/2000 |
| EP | 1029311 | 8/2000 |
| EP | 1085443 | 3/2001 |
| EP | 1115095 | 7/2001 |
| EP | 1153375 | 11/2001 |
| EP | 1256864 | 11/2002 |
| EP | 1265200 | 12/2002 |
| EP | 1265202 | 12/2002 |
| JP | 2002-157537 | 5/2002 |
| WO | WO 92/10901 | 6/1992 |
| WO | WO 93/03446 | 2/1993 |
| WO | WO 98/37675 | 8/1998 |
| WO | WO 98/58339 | 12/1998 |
| WO | WO 99/18529 | 4/1999 |
| WO | WO 00/33221 | 6/2000 |
| WO | WO 00/36570 | 6/2000 |
| WO | WO 00/57330 | 9/2000 |

OTHER PUBLICATIONS

Bodendorf, F., et al. Secure Internet-Based Transactions for Public Services. Proceedings of the ISCA 16th International Conference Computers and their Applications. p. 429-32. Int. Soc. Comput. & their applications-ISCA, Seattle, WA. USA. 2001.

Bodendorf, F., et al. Internet Based Self Service Systems for Customer-Oriented Processes in Public Administration. Proceedings of the 8th European Conference on Information Systems. vol. 2. p. 1131-5. Vienna Univ. Econ. & Bus. Adm. Vienna, Austra. 2000.

Jong-Hyeon Lee. A Resilient Access Control Scheme for Secure Electronic Transactions. Proceedings of the 3rd USENIX Workshop on Electronic Commerce p. 75-82, USENIX Assoc. Berkeley, CA. USA. 1998.

Moroshima, S., et al. Hitachi Commerce Solution: Total Solution for Electronic Commerce. Hitachi. Aug. 19997. Japan.

Mao, W. On Crytographic Techniques for Online Bankcare Payment Transactions Using Open Networks. Springer-Verlag. Berlin, Germany. 1997.

Wenbo Mao. On Two Proposals for On-line Bankcard Payments Using Open Networks: Problems and Solutions. Proceedings 1996 IEEE Symposium on Security and Privacy (cat. No. 96CB35924) p. 201-10. IEEE Comput. Soc. Press. Los Alamitos, CA. USA. 1996.

Madigan, P. Pays to Change (Automated Payments). CA Magazine. Apr. 1993.

Bellare, M, et al. Varietycase: A Multi-Purpose Electronic Payment System. Proceedings of the 3rd Usenix Workshop on Electronic Commerce. 1998.

Medvinsky, G., et al. Electronic Currency for the Internet. EM-Electronic Markets. Oct. 1993.

Fera, L., et al. Digital Cash Payment Systems. Dec. 1996.

Knorr, E., et al. On Digital Money and Card Technologies. Department of Computer Science. University of British Columbia. Jan. 1997.

McDonald, D., et al. Just Talk to Me: A Field Study of Expertise Location. Proceedings of the 1998 ACM Conference on Computer Supported Cooperative Work (CSCW'98). Nov. 14-18, 1998.

Medvinsky, G., et al. Netcash: A Design for Practical Electronic Currency on the the Internet. Association for Computing Machinery. 1993.

Anderson, R., et al. Netcard—A Practical Electronic Cash System. Computer Laboratory. Cambridge CB2 3QG.

Wells Fargo SecureSource Webpayment Suite. http://wfsecuresource.com/webpayment_suite.html.

Blazing a Trail in Point of Sale Truncation, *American Banker*, vol. CLXII, No. 123, p. 16, 1 page Abstract (Jun. 27, 1997).

O'Mahony, D. et al., "Credit card-based systems," *Electronic Payment Systems*, Artech House, Inc., Chapter 4, pp. 61-83 (1997).

Puttre, J., "Can Internet Standards Bring EDI to Everyone?" *Business Communications Review*, vol. 27, Issue 8, 5 pages (Aug. 1997).

Utility Industry Group Implementation Standard for Electronic Data Exchange, *Utility Industry Group*, 850 Purchase Order Ver/Rel 004010, 54 pages (Oct. 7, 1999).

Written Opinion of the International Searching Authority on PCT/US05/23462 mailed Dec. 26, 2006, 3 pages.

TRANSACTION ID SYSTEM AND PROCESS

CROSS-REFERENCE TO RELATED APPLICATIONS

This application is a continuation-in-part of U.S. patent application Ser. No. 09/703,357, Method and Apparatus for Integrated Payments Processing and Decisioning for Internet Transactions, filed 31 Oct. 2000 now U.S. Pat. No. 7,333,953, and claims priority to U.S. Provisional Patent Application Ser. No. 60/585,371, Transaction ID Process, filed Jul. 2, 2004, both of which applications are incorporated herein in their entirety by this reference thereto.

BACKGROUND OF THE INVENTION

1. Technical Field

The invention relates to electronic transactions. More particularly, the invention relates to a system and process for establishing and maintaining a transaction ID that enables a merchant to track a transaction over all systems and tie back any activity against such transaction over time.

2. Description of the Prior Art

In order for a credit card transaction to be processed, it must go through a set of intermediary entities until a resolution is established. For example, an e-commerce transaction can include: a merchant server makes a request for funds; the transactional data is sent to the acquirer server, which sends the transactional data to the card association server for verifying compliance with the credit card association; the transaction is then forwarded to an associated issuing bank server for funds availability and settlement determination. Upon such determination, the transaction is then re-routed backwards through the process. Each component in each step of the process requires certain information in a specified manner. Because of this constraint, each step of the process requires from the next step of the process not only that step's requirements, but also the previous step's requirements. The end result is that the burden is on the merchant to offer different information in different electronic formats to satisfy the data needs of each intermediary entity at each step of the transaction process. Each intermediary entity takes the informational data it needs and passes the transactional data onto the next intermediary for the next step.

Because the merchant server is the last step in this chain, the merchant server presently does not have its own unique format or information attached with any particular transaction. Furthermore, a merchant does not necessarily have the capability of creating such a transaction ID. Barriers to a merchant having capability of creating merchant transaction IDs include that the cost for development can be prohibitive and overwhelming for a single merchant and also that coordination among merchants may not be achieved because the intermediary entities may not allow for each merchant to create its own proprietary system.

The effects of such a disjointed system and process fall entirely on the merchant. Further problems a merchant can encounter include the following:

Often, there is no certain transactional match throughout the life cycle of the transaction because the many different systems involved use different and unrelated identifiers in their messages and logs;

Reconciliation of a transaction, if at all possible, takes a lot of time because a merchant can't use its own identifier to search the database hosted by the acquirer;

Reconciliation of a transaction, if at all possible, takes a lot of manual labor because of the prior condition. The merchant has to use non-specific search criteria, such as card number and dollar amount of a transaction, which produces multiple matches that must be sorted through manually; and Exception items which are often presented months after the original transaction are difficult to research and reconcile because the lack of a transaction identifier (transaction ID) makes it difficult or impossible to retrieve the original transaction.

It would be advantageous to provide a computer implemented system and process to facilitate a merchant identifying and tracking a particular transaction at any stage during the lifecycle of the transaction; to improve time for reconciliation of transactions; to automate reconciliation of transactions; and to organize transactional data in a meaningful way for improving transactional processes during the lifecycle of a transaction.

SUMMARY OF THE INVENTION

A system and process for creating and maintaining transaction identifiers is provided. The transaction identifiers become a kind of transaction DNA. The DNA or portions thereof is passed along with other transactional information through the same set of intermediaries as found in a standard transaction processing system. The DNA can be based on a source ID, merchant ID, and order ID. The order ID is a unique number that can be generated by the merchant or can be generated by a gateway system when the merchant does not provide an order ID. The DNA is maintained throughout the lifecycle of the transaction and any subsequent activity associated with such transaction, including authorization of payment, settlement, chargebacks, chargeback reversals, and other dispute resolution. Hence, a merchant can track a transaction over all systems and can tie back any activity against it over time. This process can be used for credit card transactions and electronic check transactions. It is also available for multi-currency transactions. The DNA for transactions allows a bank to provide precise transactional matching back to the original transaction for the merchant, such that for the merchant reconciliation is always possible, reconciliation is fast, reconciliation is automatic, and information is presented in the manner that the merchant chooses.

DETAILED DESCRIPTION OF THE INVENTION

A system and process for creating and maintaining transaction identifiers is provided. The transaction identifiers become a kind of transaction DNA. The DNA or portions thereof is passed along with other transactional information through the same set of intermediaries as found in a standard transaction processing system. The DNA can be based on a source ID, merchant ID, and order ID. The order ID is a unique number that can be generated by the merchant or can be generated by a gateway system when the merchant does not provide an order ID. The DNA is maintained throughout the lifecycle of the transaction and any subsequent activity associated with such transaction, including authorization of payment, settlement, chargebacks, chargeback reversals, and other dispute resolution. Hence, a merchant can track a transaction over all systems and can tie back any activity against it over time. This process can be used for credit card transactions and electronic check transactions. It is also available for multi-currency transactions. The DNA for transactions allows a bank to provide precise transactional matching back to the original transaction for the merchant, such that for the merchant reconciliation is always possible, reconciliation is fast, reconciliation is automatic, and information is presented in the manner that the merchant chooses.

It should be appreciated that the terms transaction ID, transaction DNA, and DNA are used interchangeably herein.

In one embodiment of the invention, the transaction DNA is based on or includes the following information:
Source ID;
Client ID; and
Merchant Order ID (or Order ID), a unique number that can be generated by the merchant or by the system for the merchant.

It should be appreciated that the DNA is maintained throughout the entire life of the given transaction and any subsequent activity associated with such transaction, such as for example:
Authorization of payment;
Settlement;
Chargebacks;
Chargeback Reversals; and
Other dispute resolution.

This invention can be used for credit cards, electronic checks such as MasterCard, Visa, Amex, and Discover, and for multi-currency transactions. It should be appreciated that Amex and Discover capability adds a great value because such transactions are usually processed with the minimal tracking and reporting capabilities.

It should further be appreciated that the transaction DNA provides precise transactional matching to the original transaction for the merchant whereby the following is true:
Reconciliation is always possible;
Reconciliation is fast;
Reconciliation is automatic; and
Information can be presented in a manner chosen by the merchant.

An Exemplary Transaction Authorization Flow

Figure 1:
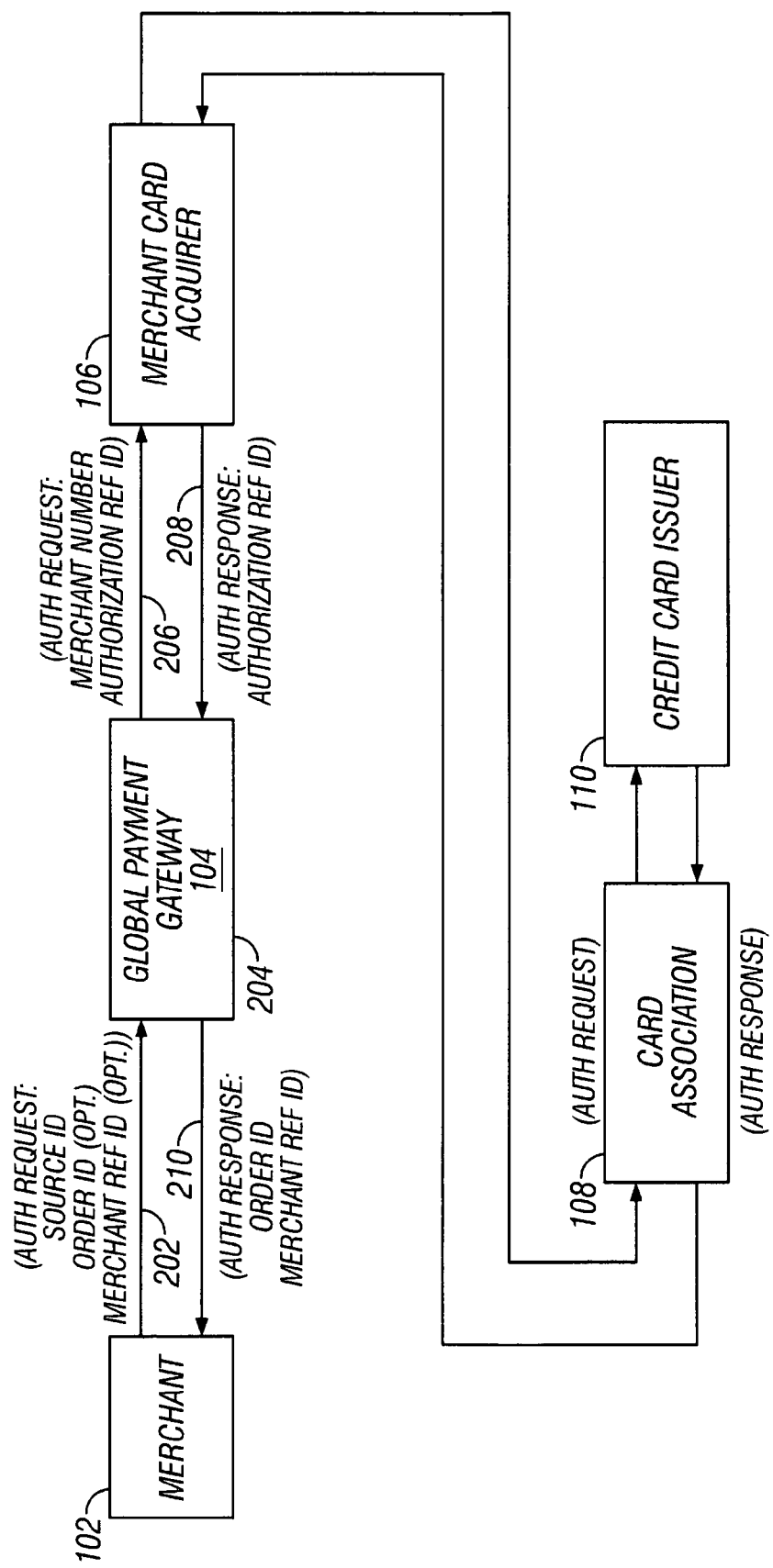
FIG. 1 is an authorization flow diagram using transaction ID according to the invention.

One embodiment of the invention can be described with reference to FIG. 1, a detailed transaction authorization flow diagram showing the creation and passing of component IDs of the more generalized transaction ID according to the invention.

On each authorization request the merchant 102 passes a previously assigned Source ID (202) to a global payment gateway 104. The Source ID (202) is a value assigned by the Global Payments Gateway (GPG) to each major entity that generates transactions into the GPG. In one embodiment of the invention, the Source ID (202) is the highest level identifier in a GPG hierarchy of identifiers. The merchant passes a merchant self-assigned Merchant Reference ID. In one embodiment of the invention, the merchant generates and passes a unique Order ID to the GPG. The global payment gateway checks the Order ID to verify that it is unique within the Source ID.

In one embodiment of the invention, if the merchant does not send an Order ID, then the global payment gateway generates a unique Order ID on the merchant's behalf (204).

It should be appreciated that in one embodiment of the invention, the Source ID has under it one or more Merchant Ref IDs which has under it one or more Order IDs, thus defining a type of hierarchy of identifiers.

The global payment gateway generates 104 a unique Authorization Reference ID, using both the Order ID and the Merchant Reference ID (if available), and passes the Authorization Reference ID to the acquirer 106 as part of the authorization request (206). The acquirer 106 then passes the authorization request (206) through the card association 108 to the card issuer 110.

After receiving an authorization response from the credit card issuer 110, the acquirer 106 returns the authorization response with the original Authorization Reference ID back to the global payment gateway (208).

The global payment gateway 104 uses the Authorization Reference ID to retrieve both the original Order ID and Merchant Reference ID (if present.) Hence, the global payment gateway 104 returns the authorization response to the merchant 102 with the unique Order ID and the Merchant Reference ID (if present), both obtained from the returned Authorization Reference ID (210).

It should be appreciated that according to invention, the Order ID is fully retrieved for the merchant, as opposed to being lost.

An Exemplary Transaction Settlement Flow

Figure 2:
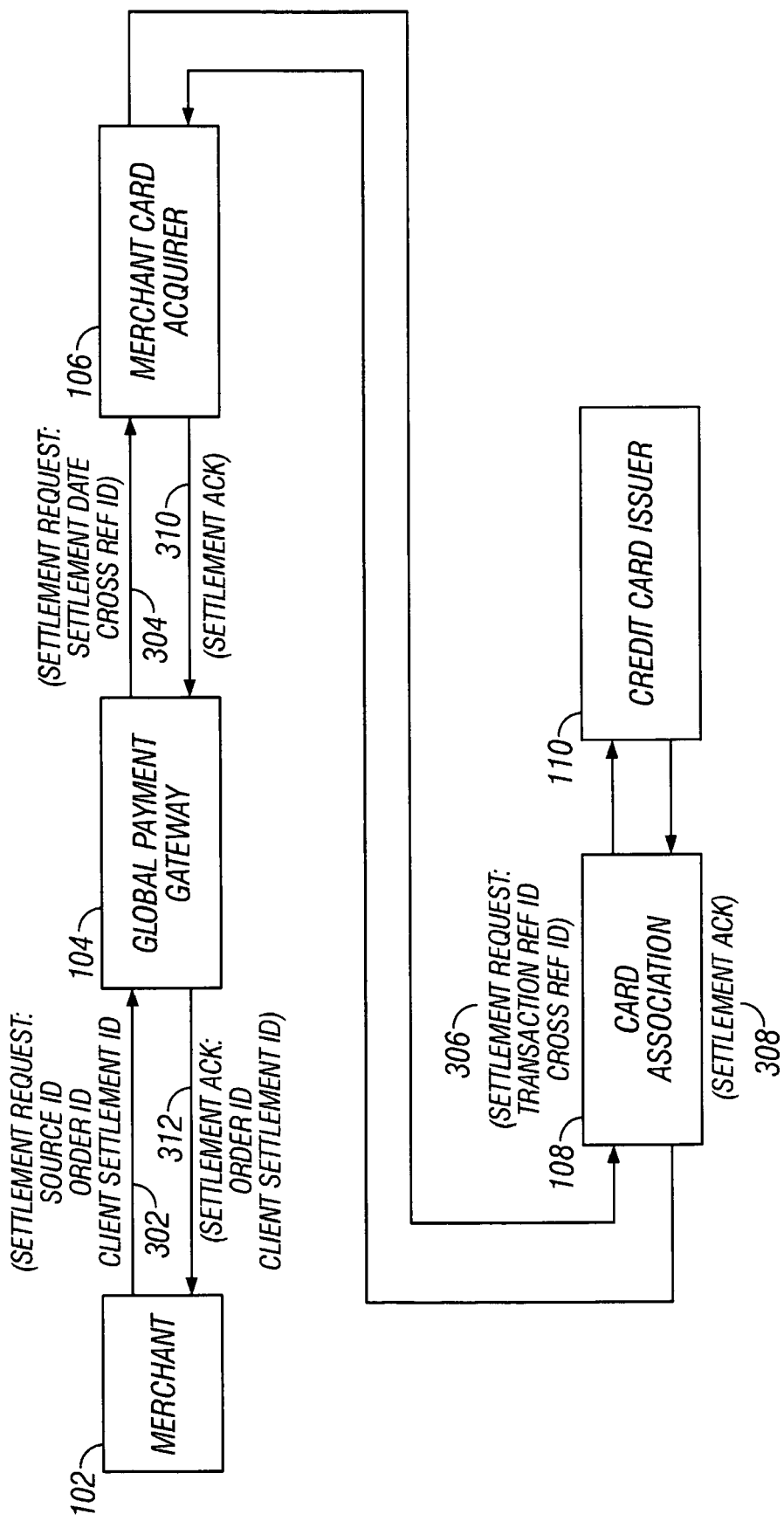
FIG. 2 is a settlement flow diagram using transaction ID according to the invention.

One embodiment of the invention can be described with reference to FIG. 2, a detailed transaction settlement flow diagram showing the creation and passing of component IDs of the more generalized transaction ID according to the invention.

In one embodiment of the invention, on each settlement request (302), such as after shipment of the purchased item, the merchant 102 passes the previously assigned Source ID, the unique Order ID and a unique Client Settlement ID to the global payment gateway 104. The unique Client Settlement ID is used by the global payment gateway 104 to avoid duplicate settlements.

Once the global payment gateway 104 determines the settlement request is not a duplicate request, the gateway 104 generates a unique Cross Reference ID and passes it (304) along with the settlement date to the acquirer 106 as part of the settlement request. In one embodiment of the invention, the acquirer imbeds this unique Cross Ref ID into a unique Transaction Reference ID that is created by the acquirer and maintained by the issuer and acquirer for the life of the settled transaction. The acquirer 106 sends the settlement request along with the Transaction Reference ID (306) to the card issuer 110 for processing.

The acquirer 106 receives an acknowledgement to the settlement request (308) from the issuer 110 and then passes it (310) to the global payment gateway 104. The global payment gateway 104 uses the Transaction Ref ID and the embedded Cross-Ref ID from the settlement acknowledgment to retrieve the Order ID and the Client Settlement ID.

The global payment gateway returns (312) the settlement acknowledgement to the merchant 104 along with the Order ID and the Client Settlement ID so that the merchant can reconcile the settlement.

It should be appreciated that the invention provides a cross reference lookup table to identify and retrieve any of the following: Transaction Reference ID, Cross Reference ID, Client Settlement ID, Order ID, and Authorization Reference ID. In one embodiment of the invention, the global payment gateway creates the cross-reference table. An example table can be found in Table A herein below.

TABLE A

| Transaction Ref ID | Cross Reference ID | Client Settlement ID | Order ID | Authorization Reference ID |
|---|---|---|---|---|
| Abc | Xyz | 123 | Uvw | 456 |

An Exemplary Transaction Exception Item Flow

Figure 3:
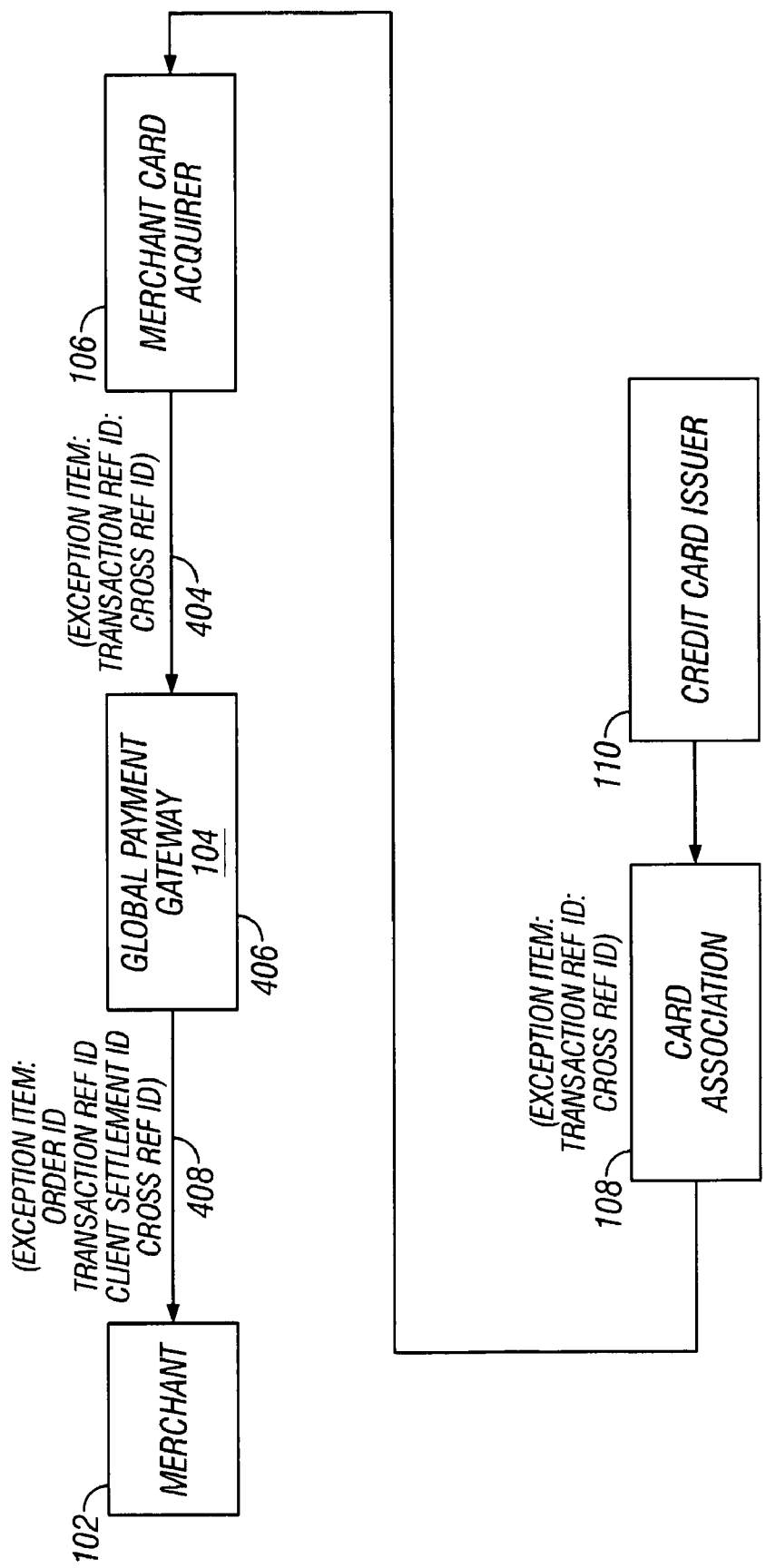
FIG. 3 is an exception item flow diagram using transaction ID according to the invention.

Suppose thirty to sixty days after a transaction a consumer is not happy with the purchased and received shipped item. The process of negotiating the consequent consumer's dispute is referred to herein as a transaction exception item. One embodiment of the invention can be described with reference to FIG. 3, wherein a detailed exception item flow diagram shows the creation and passing of component IDs of the more generalized transaction ID according to the invention.

The card issuing bank 110 receives and processes a transaction dispute request from a cardholder. Based on the type of dispute the card issuer creates and issues either a chargeback or retrieval request (402), i.e. an exception item request, to the acquirer 106. The Transaction Reference ID with the embedded Cross Reference ID from the original settlement request is included in the exception item request.

The acquirer 106 passes the exception item and the Transaction Reference ID (404) with the embedded Cross Reference ID to the global payment gateway 104.

The global payment gateway 104 extracts (406) the Cross Reference ID from the Transaction Reference ID and, using the cross reference table, retrieves the original transaction information from its database by using the Cross Reference ID and the original settlement date.

The global payment gateway 104 sends the merchant 102 the exception item with the original Order ID, Client Settlement ID and Transaction Reference ID (408) so that the merchant can electronically retrieve the original transaction details from its database in order to research and reconcile the exception item.

Hence, it should be appreciated that with Beginning of Day (BOD) Exception and End of Day (EOD) Reconciliation file transfer to the merchant, the invention provides the merchant daily reconciliation and comprehensive reporting capability. This combined functionality allows the customer to have one seamless picture of all his or her transactions at any given point of the transaction's path and on any date.

It should be appreciated that the configuration of servers and certain processes for the merchant, global payment gateway, acquirer, card association, and issuer are meant by way of example only. The software and hardware implementations can be distributed among one or more servers and one or more computer applications or modules without departing from the scope and spirit of the invention.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A computer implemented method for a merchant to track an original transaction throughout a lifecycle of the original transaction, the method comprising the steps of:

sending, by a global payment gateway server, an authorization response along with a merchant reference identifier and an order identifier to the merchant, a merchant authorization request including the merchant reference identifier and the order identifier, said original transaction associated with the merchant authorization request and the authorization response, the order identifier being a unique number received from the merchant, the merchant reference identifier being an identifier for said original transaction received from said merchant;

sending, by the global payment gateway server, a settlement acknowledgment along with the order identifier and a client settlement identifier to the merchant, a merchant settlement request including said order identifier and said client settlement identifier, said original transaction associated with the merchant settlement request and the settlement acknowledgment, the client settlement identifier being a unique identifier used by the global payment gateway server to avoid duplicate settlements; and sending, by the global payment gateway server, an exception item request along with said order identifier, a transaction reference identifier, and said client settlement identifier to the merchant, said original transaction associated with said exception item request, the transaction reference identifier received from an acquirer of the original transaction.

2. The computer implemented method of claim 1, wherein the method further comprises the steps of:

generating, by the global payment gateway server, a source identifier, the source identifier being a value assigned by the global payment gateway server to said merchant;

sending, by the global payment gateway server, the source identifier to the merchant, wherein said source identifier is unique to said merchant;

receiving, at the global payment gateway server, said merchant authorization request from said merchant, wherein said merchant authorization request comprises said source identifier, said order identifier, and said merchant reference identifier;

generating, by said global payment gateway server, an authorization reference identifier using said order identifier;

sending, by said global payment gateway server, said authorization reference identifier to said acquirer for processing;

receiving, by said global payment gateway server, said authorization response from the acquirer, wherein said authorization response comprises said authorization reference identifier; and responsive to receiving said authorization response, using, by said global payment gateway server, said authorization reference identifier to retrieve said order identifier and said merchant reference identifier.

3. The computer implemented method of claim 2 further comprising the step of: determining that said order identifier was not received by said global payment gateway server; and in response to determining that the order identifier was not received by the global payment gateway server, generating, by said global payment gateway server, the order identifier, the order identifier associated with said original transaction.

4. The computer implemented method of claim 2, wherein the method further comprises the steps of:

receiving, at said global payment gateway server, said merchant settlement request from said merchant, said merchant settlement request comprising said source identifier, said order identifier, and said client settlement identifier;

generating, by said global payment gateway server, a cross reference identifier;

sending said merchant settlement request to said acquirer along with a settlement date and said cross reference identifier, the cross reference identifier embedded in said transaction reference identifier;

receiving, at said global payment gateway server, said settlement acknowledgment from said acquirer, said settlement acknowledgment responsive to said merchant settlement request; and using, by said global payment gateway server, said cross reference identifier to retrieve said order identifier and said client settlement identifier.

5. The computer implemented method of claim 4, wherein the method further comprises the steps of:

receiving, at the global payment gateway server, said exception item request from said acquirer prior to sending the exception item request to the merchant, said exception item request comprising said transaction reference identifier in which is embedded said cross reference identifier; and responsive to receiving said exception item request, extracting, by said global payment gateway server, said cross reference identifier from the transaction reference identifier.

6. The computer implemented method of claim 4, further comprising the step of:

providing, by said global payment gateway server, a cross reference table to associate said transaction reference identifier, said cross reference identifier, said client settlement identifier, and said order identifier.

7. A global payment gateway server on a computer network for a merchant to track an original transaction throughout a lifecycle of the original transaction, the global payment gateway server comprising:

means for sending an authorization response for the original transaction to said merchant, the authorization response including a merchant reference identifier and an order identifier, a merchant authorization request including the merchant reference identifier and the order identifier, said original transaction associated with the merchant authorization request and the authorization response, said order identifier being a unique number, the merchant reference identifier being an identifier received from said merchant;

means for sending a settlement acknowledgment to said merchant, the settlement acknowledgment including the order identifier and a client settlement identifier, a merchant settlement request including said order identifier and said client settlement identifier, said original transaction associated with the merchant settlement request and the settlement acknowledgment, said client settlement identifier being a unique identifier used by the global payment gateway server to avoid duplicate settlements; and means for sending an exception item request to said merchant, the exception item request including said order identifier, a transaction reference identifier, and said client settlement identifier, said original transaction associated with said exception item request, the transaction reference identifier received from an acquirer of the original transaction.

8. The global payment gateway server of claim 7, further comprising:

means for generating a source identifier, said source identifier being unique to said merchant, the source identifier being a value assigned by the global payment gateway server to said merchant;

means for sending said source identifier to said merchant;

means for receiving the merchant authorization request from said merchant, said merchant authorization request comprising said source identifier, said order identifier, and the merchant reference identifier;

means for generating an authorization reference identifier using said order identifier;

means for sending said authorization reference identifier to said acquirer;

means for receiving said authorization response from said acquirer, wherein said authorization response comprises said authorization reference identifier; and means for using, responsive to receiving said authorization response, said authorization reference identifier to retrieve said order identifier and said merchant reference identifier.

9. The global payment gateway server of claim 7 further comprising:

means for generating the order identifier, said order identifier was not available and not sent to said global payment gateway server.

10. The global payment gateway server of claim 8, further comprising:

means for receiving said merchant settlement request, said merchant settlement request comprising said source identifier, said order identifier, and said client settlement identifier, said merchant settlement request received from said merchant, said client settlement identifier received from said merchant;

means for generating a cross reference identifier;

means for sending said merchant settlement request to said acquirer, said merchant settlement request further comprising a settlement date and said cross reference identifier, said merchant settlement request further comprising said transaction reference identifier, said transaction reference identifier including said cross reference identifier;

means for receiving said settlement acknowledgment from the acquirer, the settlement acknowledgment responsive to said merchant settlement request; and means for using said cross reference identifier to retrieve said order identifier and said client settlement identifier.

11. The global payment gateway server of claim 10, further comprising:

means receiving the exception item request from said acquirer, said exception item request comprising said transaction reference identifier, said cross reference identifier being embedded in said transaction reference identifier; and means for extracting, responsive to receiving said exception item request, said cross reference identifier.

12. The global payment gateway server of claim 10, further comprising:

a cross reference table to associate said transaction reference identifier, said cross reference identifier, said client settlement identifier, and said order identifier.

* * * * *